US009274877B2

(12) United States Patent
Gutjahr et al.

(10) Patent No.: US 9,274,877 B2
(45) Date of Patent: Mar. 1, 2016

(54) INCIDENT HANDLING (75) Inventors: Bernd Gutjahr, Ostelsheim (DE);
Martin Bosler, Wannweil (DE);
Christian Schaefer, Kirchestellinsfurt (DE)

(73) Assignee: Hewlett Packard Enterprise Development LP, Houston, TX (US)

(*) Notice: Subject to any disclaimer, the term of this patent is extended or adjusted under 35 U.S.C. 154(b) by 186 days.

(21) Appl. No.: 14/235,393

(22) PCT Filed: Jul. 31, 2011

(86) PCT No.: PCT/US2011/046064
§ 371 (c)(1),
(2), (4) Date: Jan. 27, 2014

(87) PCT Pub. No.: WO2013/019201
PCT Pub. Date: Feb. 7, 2013

(65) Prior Publication Data
US 2014/0173340 A1    Jun. 19, 2014

(51) Int. Cl.
*G06F 11/00*    (2006.01)
*G06F 11/07*    (2006.01)
*G06F 9/48*    (2006.01)
*G06Q 10/06*    (2012.01)
(Continued)

(52) U.S. Cl.
CPC .............. *G06F 11/0793* (2013.01); *G06F 5/14* (2013.01); *G06F 9/4881* (2013.01); *G06Q 10/06* (2013.01); *H04L 43/067* (2013.01); *G06F 9/4887* (2013.01); *H04L 41/0622* (2013.01); *H04L 41/0816* (2013.01)

(58) Field of Classification Search
CPC ....... G06F 5/14; G06F 9/4881; G06F 9/4887;
G06F 11/0793; G06F 11/0781; G06F 11/0757;
G06Q 10/06; G06Q 10/06312; H04L 43/067;
H04L 41/0622; H04L 41/0816; H04L 41/06;
H04L 41/0604; H04L 41/064
See application file for complete search history.

(56) References Cited

U.S. PATENT DOCUMENTS 6,629,106 B1    9/2003    Narayanaswamy et al.
7,500,241 B1 *  3/2009    Flockhart .............. G06F 9/4881
                                            718/100
(Continued)

OTHER PUBLICATIONS

Drools Fusion, www.jboss.org; accessed from Internet on Jul. 31, 2011, 5 pages.
HP CloudSystem Matrix, Solution brief, copyright 2009-2011, 8 pages.
(Continued)

*Primary Examiner* — Bryce Bonzo
*Assistant Examiner* — Anthony J Amoroso
(74) *Attorney, Agent, or Firm* — Hewlett Packard Enterprise Patent Department (57) ABSTRACT

A first future time occurs sooner than a second future time. The first future time indicates when the first and second future times are to be evaluated. The second future time provides a boundary between schedules occurring sooner and schedules occurring later. A schedule is generated and added to a database stored in a non-volatile storage. The schedule is for executing, in relation to an incident, an incident-handling action corresponding to a condition matching the incident. The schedule has an execution time at which to execute the incident-handling action in relation to the incident. Where the execution time is sooner than the second future time, the schedule is added to a queue stored in a volatile memory. Upon a current time equaling the execution time, the schedule is removed from the queue and correspondingly executing the incident-handling action in relation to the incident.

20 Claims, 4 Drawing Sheets

(51) Int. Cl.
  *H04L 12/26* (2006.01)
  *G06F 5/14* (2006.01)
  *H04L 12/24* (2006.01)

(56) References Cited

U.S. PATENT DOCUMENTS

| | | | | |
|---|---|---|---|---|
| 8,566,897 | B2* | 10/2013 | Sequeira | G06F 9/4881 725/145 |
| 2004/0216098 | A1* | 10/2004 | Roe | G06F 9/4887 717/161 |
| 2004/0243447 | A1 | 12/2004 | Kamiyama et al. | |
| 2004/0243636 | A1 | 12/2004 | Hasiewicz et al. | |
| 2005/0050543 | A1 | 3/2005 | Ogus et al. | |
| 2006/0161551 | A1 | 7/2006 | Liebling | |
| 2007/0294258 | A1 | 12/2007 | Caldwell et al. | |
| 2009/0063234 | A1 | 3/2009 | Refsdland et al. | |
| 2009/0313219 | A1 | 12/2009 | Gupta et al. | |
| 2010/0083145 | A1 | 4/2010 | Schang et al. | |
| 2011/0161397 | A1 | 6/2011 | Bekiares et al. | |

OTHER PUBLICATIONS

IBM Tivoli Enterprise Console. Rule Set Reference. Aug. 2003, 94 pages.
Korean Intellectual Property Office, International Search Report and Written Opinion, Mar. 5, 2012, 9 pages, Daejeon; Republic of Korea.
R. Gupta et al., "Automating ITSM incident management process," 2008 Int'l Conf. on Automonic Computing, 10 pages.
R. Gupta et al., "Multi-dimensional knowledge integration for efficient incident management in a services cloud," 2009 IEEE Int'l Conf. on Services Computing, 8 pages.
European Patent Office, Extended European Search Report, issued in European App. No. 11870431, Feb. 26, 2015.
International Bureau, International Preliminary Report on Patentability, Feb. 4, 2014, issued in PCT Application PCT/US2011/046064.
JBoss Community, "Drools Fusion," available Jun. 10, 2011, (accessed Jul. 31, 2011), <http://web.archive.org/web/20110610111502/http://www.jboss.org/drools/drools-fusion.ht.

* cited by examiner

INCIDENT HANDLING

BACKGROUND

Large-scale and complex systems can routinely generate incidents that have to be addressed in order to ensure the smooth running of such systems. For instance, in large-scale and complex computing systems in particular, both hardware and software can generate faults or even fail, among other types of incidents. To ensure that these systems continue running properly, such incidents have to be handled promptly.

DETAILED DESCRIPTION

As noted in the background, large-scale and complex systems, among other types of systems, can generate incidents that have to be addressed to ensure their smooth running. Existing incident-handling architectures, however, do not scale well as the incidents that are generated increase greatly in number. Such architectures may have to have larger and larger amounts of volatile semiconductor memory, for instance, to ensure that the incidents are timely and promptly addressed.

Disclosed herein are techniques for handling incidents in a manner that scales much better than existing incident-handling architectures. A database of schedules is stored in a non-volatile storage device, like a hard disk drive. Each schedule relates to an incident, and specifies an execution time when an incident-handling action corresponding to a condition matching the incident is to be executed.

First and second future times are specified, where the former curs before the latter. The first future time indicates when the first and second future times are to be evaluated or specified again. The second future time provides a boundary between the schedules occurring sooner and the schedules occurring later. A queue is stored in a volatile memory device, like a volatile semiconductor memory. The queue is of just those schedules specifying execution times that are sooner than the second future time.

When the current time matches the execution time of a schedule within the queue, the schedule is removed from the queue, as well as from the database, and the incident-handling action of the schedule is executed in relation to the corresponding incident. When the current time matches the first future time, appropriate management of the first and second future times occur. Specifically, the queue can be managed to accommodate increasing number of incidents, with little or no increase in the amount of volatile memory allocated to the queue.

For instance, the first and second future times can be re-specified so that the queue does not have to increase in size, or is increased in size by a limited amount. Upon the first and second future times being re-specified, the schedules having execution times that are sooner than the new second future time are copied from the database to the queue. Likewise, the schedules having execution times that are later than the new second future time are removed from the queue.

Figure 1:
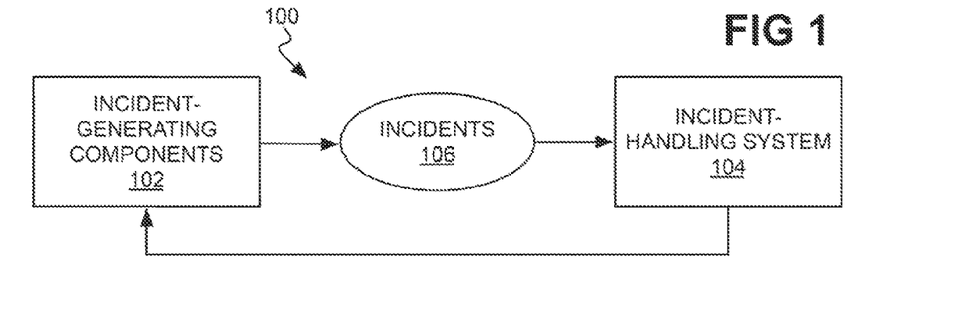
FIG. 1 is a diagram of an example environment in which an incident-handling system handles incidents generating by incident-generating components.

FIG. 1 shows a generalized example environment 100 that includes incident-generating components 102 and an incident-handling system 104 for handling incidents 106 that the components 102 generate. The incident-generating components 102 can include software and hardware components, as well as other types of components, which generate the incidents 106. The incident-generating components 102 may be part of a large-scale and complex system, for instance, which may be the same system or a different system as compared to the incident-handling system 104.

The incident-handling system 104 receives the incidents 106 generated by the incident-generating component 102. In response, the incident-handling system 104 appropriately handles the incidents 106 to resolve them. For instance, the incident-handling system 104 may manipulate, or cause to be manipulated, the incident-generating components 102. In this respect, the overall incident-handling approach within FIG. 1 is in the form of a feedback loop, in which the incident-generating components 102 generate the incidents 106, and the incident-handling system 104 resolve the incidents 106 by manipulating or causing to be manipulated the components 102.

Figure 2:
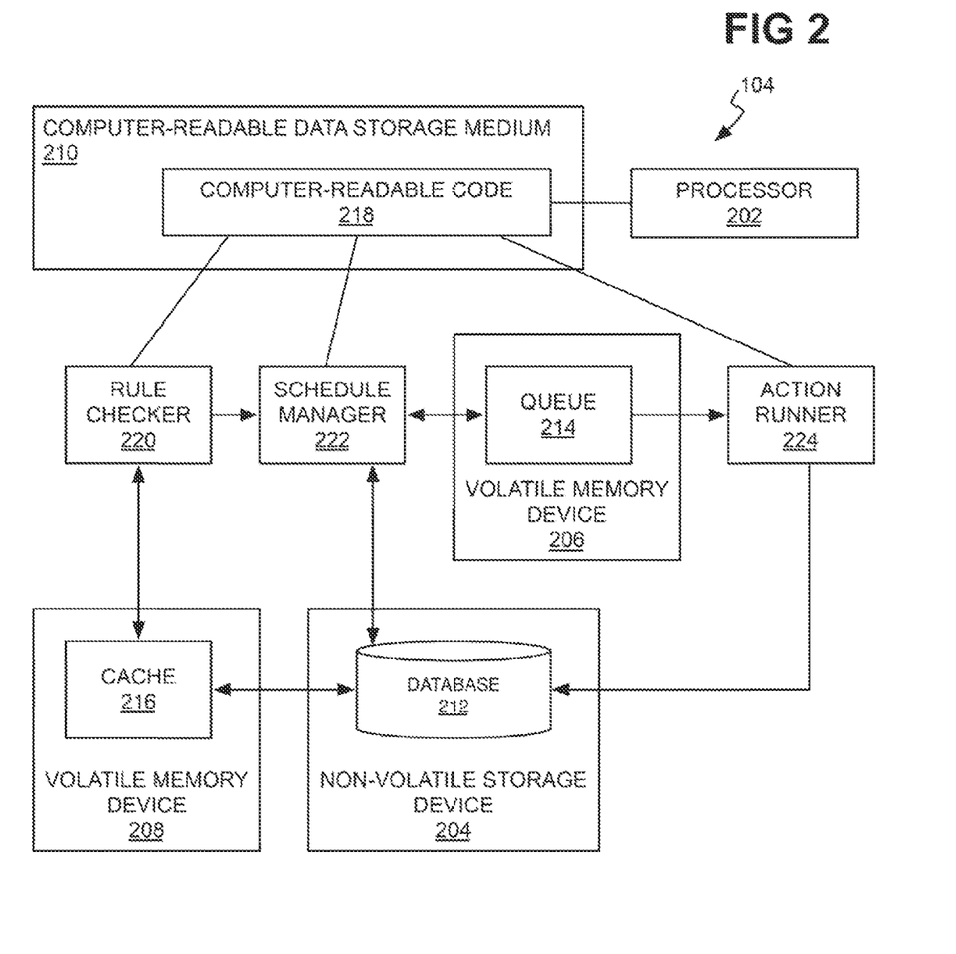
FIG. 2 is a diagram of an example incident-handling system.

FIG. 2 shows an example incident-handling system 104 in detail. The system 104 can be implemented as or over one or more computing devices, like computers. The system 104 can include a processor 202, a non-volatile storage device 204, volatile memory devices 206 and 208, and a computer-readable data storage medium 210.

The non-volatile storage device 204 is non-volatile in that the storage device 204 persistently stores data. As such, even when power is removed from the storage device 204, the data remains stored within the storage device 204. The non-volatile storage device 204 may be a hard disk drive, a solid state drive, or another type of non-volatile storage device.

The non-volatile storage device 204 stores a database 212 that includes schedules. Each schedule is for executing, in relation to an incident, a corresponding incident-handling action corresponding to a condition that the incident matches. Each schedule specifies an execution time at which the incident-handling action in question is to be executed, or run, in relation to the incident.

The database 212 also includes matching states of the incidents and the conditions. Each matching state can be an incident and a condition pair. The incident of such a pair satisfies, or matches, the condition of the pair.

The volatile memory devices 206 and 208 can be the same volatile memory device, or different volatile memory devices. The memory devices 206 and 208 are volatile in that the devices 206 and 208 do not persistently store data. As such, when power is removed from the memory devices 206 and 208, the data that had been stored within the devices 206 and 208 is lost. The memory devices 206 and 208 may each be a semiconductor memory device, like a dynamic random access memory (DRAM), or another type of volatile memory device.

The volatile memory device 206 stores a queue 214. The queue 214 may be a first-in, first-out (FIFO) queue. The queue 214 includes just the schedules that have sooner execution times as opposed to later execution times. Specifically there is specified a future time, which is referred to as a second future time as described in detail below, that will occur at a time delta, which is referred to as a second time delta as described in detail below, after the current time. The queue 214 includes the schedules that have execution times that are sooner than this (second) future time. The schedules within the queue 214 can be organized or sorted by their execution times.

The volatile memory device 208 stores a cache 216. The cache 216 is a mechanism by, through, or via which the matching states of the database 212 are accessed. By comparison, the schedules of the database 212 may not be accessed by, through, or via the cache 216.

The computer-readable data storage medium 210 can be or include a non-volatile storage device, such as the non-volatile storage device 204, and/or a volatile memory device, such as the volatile memory device 206 and/or 208. The computer-readable data storage medium 210 stores computer-readable code 218 that the processor 202 executes. The computer-readable code 218 implements a rule checker 220, a schedule manager 222, and an action runner 224. The same or different computer-readable code 218 may implement the rule checker 220, the schedule manager 222, and the action runner 224.

The rule checker 220 receives incidents, and matches them to rules, and more specifically to conditions. A rule may be used to specify each combination of a condition, an execution time, and an incident-handling action. An incident may include that a prior incident is no longer present, or the rule checker 220 may inspect incoming incidents to determine whether prior incidents are no longer present.

The rule checker 220 manages the matching states of the database 212 via the cache 216. When an incident is received, the rule checker 220 determines whether the incident matches the condition of any rule, and adds a corresponding matching state to the database 212. The rule checker 220 generates and passes a schedule—including the execution time and the incident-handling action—of each such matched rule to the schedule manager 222. The rule checker 220 can further determine whether each previously added matching state of the database 212 is still in effect, remove those that are not from the database 212, and notify the schedule manager 222 of such removal.

The schedule manager 222 manages the schedules within the database 212 and within the queue 214, based on the current time, on a first future time, on a second future time, and on the execution times of the schedules. The schedule manager 222 also manages the first and second futures times. The first future time indicates when the first and second future times are to be (re)evaluated or (re-)specified. The second future time provides a boundary between sooner-occurring schedules and later-occurring schedules.

When the schedule manager 222 receives a schedule from the rule checker 220, the manager 222 adds the schedule to the database 212. If the execution time of the schedule occurs before the second future time, then the schedule manager 222 adds the schedule to the queue 214. If the execution time of the schedule occurs after the second future time, then the schedule manager 222 does not add the schedule to the queue 214.

When the current time equals the first future time, the schedule manager 222 resets the first and second future times, as described in detail below. However, in general, the first future time is reset to a dynamic or static first time delta past the current time, and the second future time is reset to a dynamic or static second time delta past the current time. The first and second time deltas may be equal to one another, or different from one another.

After the first and second future times have been reset (i.e., reevaluated and/or re-specified), the schedule manager 222 adds any schedule within the database 212 having an execution time that is now sooner than the second future time to the queue 214. Similarly, after the first and second future times have been reset, the schedule manager 222 removes any schedule that no longer has an execution time that is sooner than the second future time from the queue 214. Furthermore, for any matching states that the rule checker 220 has removed from the database 212, the schedule manager 222 removes schedules that were previously added to the database 212 due to these matching states from the database 212 and the queue 214.

The action runner 224 monitors the schedules within the queue 214. The action runner 224 executes the incident-handling actions of the schedules within the queue 214 that have execution times matching the current time. The action runner 224 also removes these schedules from both the database 212 and the queue 214.

The incident-handling system 104 is event-driven. As events occur, various operations and functionality are performed within the system 104. What follows is a description of such operations and functionality that are performed responsive to at least four different events occurring. The first event is that an incident has been generated. The second event is that an incident has been resolved or is no longer present. The third event is that the current time is equal to, or matches, the first future time. The fourth event is that the current time is equal to, or matches, the execution time of at least one schedule. A fifth event can also occur, in which an existing incident has been modified, but has not been resolved.

FIGS. 3A, 3B, 3C, and 3D show example methods 300, 320, 340, and 360, respectively, of how the incident-handling system 104 operates and functions responsive to these first four events. Furthermore, the methods 300 and 320, or variations thereof, can both operate and function responsive to the fifth event, as is described below. The methods 300, 320, 340, and 360 can each be performed by the processor 202. For instance, the processor 202 can execute the methods 300, 320, 340, and 360 by executing the computer-readable code 218, which may be in the form of a computer program, that implements the rule checker 220, the schedule manager 222, and the action runner 224, from the computer-readable data storage medium 210.

Figure 3A:
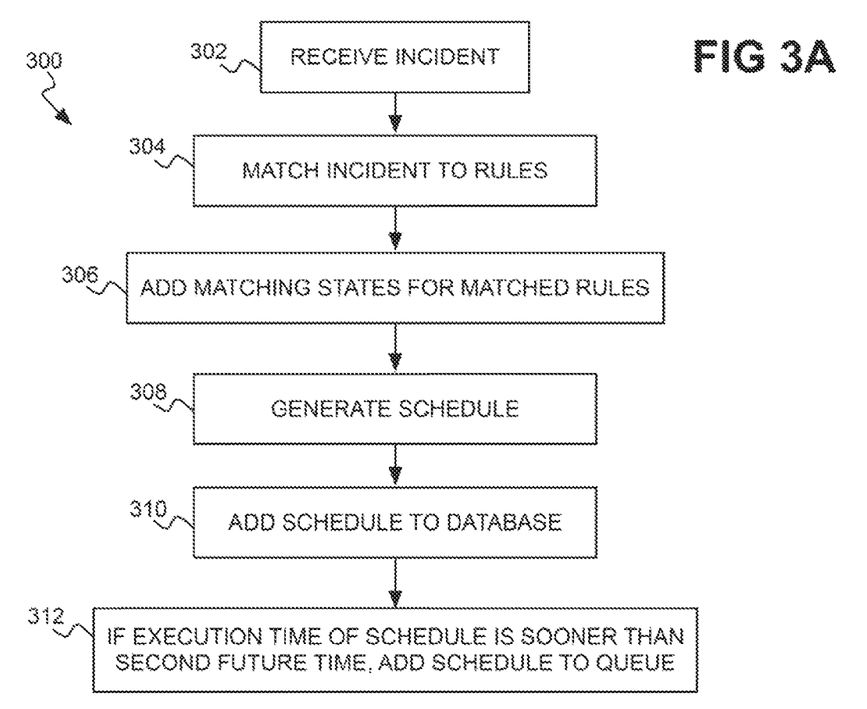
FIGS. 3A, 3B, 3C, and 3D are flowcharts of example methods of how an incident-handling system can operate responsive to respective events.

The method 300 of FIG. 3A is performed responsive to an incident having been generated. The rule checker 220 receives the incident (302), and matches the incident to the conditions of one or more rules (304). The rule checker 220 adds a matching state for each such rule to the database 212 via the cache 216 (306), and generates a schedule including the execution time of the rule and the incident-handling action of the rule (308).

The schedule manager 222 adds each such schedule to the database 212 (310). If the execution time of a schedule occurs sooner than the second future time, then the schedule manager 222 also adds the schedule to the queue 214 (312). However, if the execution time of a schedule does not occur sooner than the second future time, then the schedule manager 222 does not add the schedule to the queue 214.

The method 300 of FIG. 3A can also be performed responsive to an existing incident having been modified. In this case, the rule checker 220 matches the modified incident to the conditions of one or more rules, adds a matching state for each such rule, and generates a schedule pursuant to the method 300, no differently than if the modified incident were newly generated. Similarly, the schedule manager 222 adds each such schedule to the database 212, and possibly to the queue 214, no differently than if the modified incident were newly generated. That is, with respect to the performance of the method 300, a modified incident can be treated no differently than a new incident.

Figure 3B:
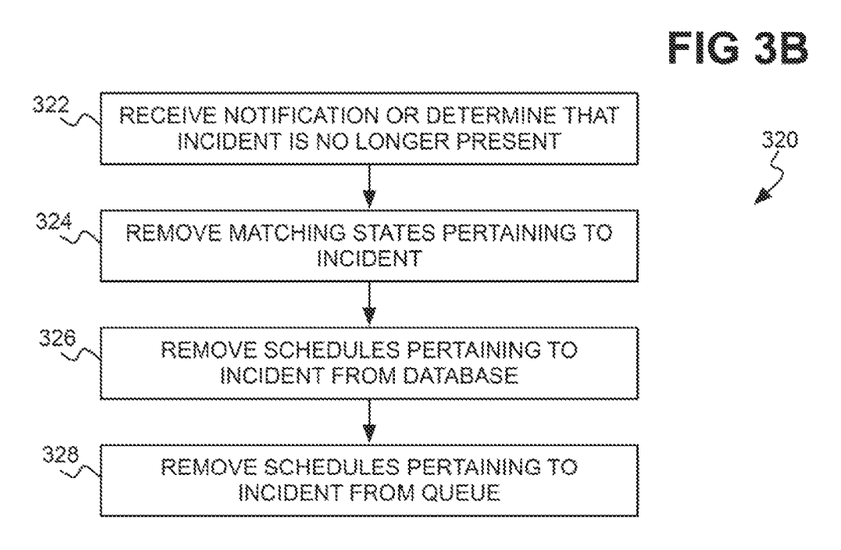

The method 320 of FIG. 3B is performed responsive to an incident having been resolved or that is otherwise no longer present. The rule checker 220 receives notification or determines that the incident is no longer present (322). The rule checker 220 removes any matching states pertaining to the incident that were previously added to the database 212 from the database 212 (324). The schedule manager 222 removes any schedules pertaining to the incident (i.e., pertaining to such matching states) that were previously added to the database 212 from the database 212 (326), and removes any of these schedules that are in the queue 214 from the queue 214 (328).

The method 320 of FIG. 3B can also be performed responsive to an existing incident that has been modified, prior to the method 300 of FIG. 3A being performed for such an incident. In this case, the rule checker 320 removes any matching states pertaining to the incident prior to its modification, removes any schedules pertaining to the incident that were previously added to the database 212, and removes any schedule that was previously added to the queue 214, no differently than if the incident were resolved instead of having been modified. That is, with respect to the performance of the method 320, a modified incident can be treated no differently than a resolved incident.

The approach that has been delineated for a modified incident is thus to perform the method 320 of FIG. 3B to first treat the incident as having been resolved, and then to perform the method 300 of FIG. 3A to then treat the incident (as has been modified) as having been newly generated. However, a hybrid approach combining the methods 300 and 320 can also be employed for a modified incident. In such a hybrid approach, each existing matching state and schedule for the incident is removed just if they no longer are applicable to the incident after modification, and new matching state(s) and schedule(s) are added if they are now applicable to the incident after modification.

Figure 3C:
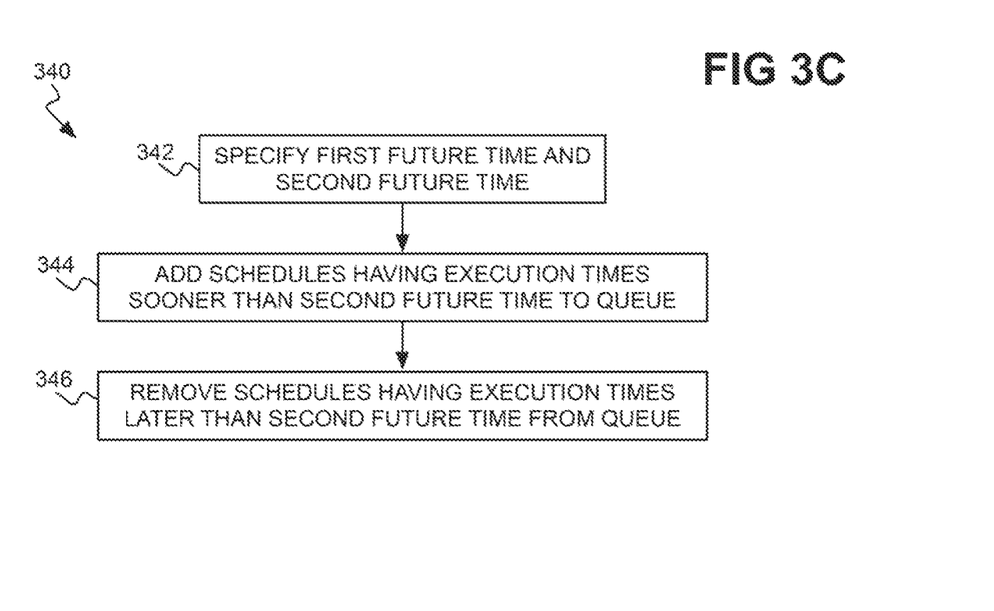

The method 340 of FIG. 3C is performed responsive to the current time equaling or matching the first future time. The scheduling manager 222 (re)specifies or (re-)evaluates the first and second future times (342). The scheduling manager 222 adds any schedules stored in the database 212 that have execution times that are now sooner than the second future time (as updated) to the queue 214 (344). Similarly, the scheduling manager 222 removes any schedules currently in the queue 214 that have execution times that are now later than the second future time (as updated) from the queue 214 (346).

An example assists in understanding the method 340. Assume that the first future time F1 was initially specified by a time delta D1 from the then-current time T=T1, such that F1=T1+D1. Likewise, assume that the second future time F2 was initially specified by a time delta D2 from the then-current time T=T1, such that F2=T1+D2. The future time F1 occurs before the future time F2, such that F1<F2, and such that D1<D2.

When time has elapsed such that the current time is now T=T2=F1, then the method 340 is performed. In part 342, the future times F1 and F2 are reset. In one scenario, the time deltas D1 and D2 are static and do not change. Therefore, the first future time F1 is reset to F1=T2+D1, and the second future time F2 is reset to F2=T2+D2. In part 344, then, schedules that had execution times later than the old second future time F2 but that are sooner than the new second future time F2 are added to the queue 214.

However, in another scenario, the time deltas D1 and D2 are dynamic, and can change. The schedule manager 222 may reset the future times F1 and F2 based on, for instance, the size of the queue 214 and the number and execution times of schedules within the queue 214 and/or the database 212. For example, if the size of the queue 214 is such that the queue 214 is near full capacity, the number of schedules within the queue 214 may be effectively decreased, by decreasing the time delta D2. As such, some schedules within the queue 214 may be removed in part 346, because their execution times are no longer less than the second future time F2. The time delta D1 may also be decreased, so that the future times F1 and F2 are evaluated sooner next time.

Figure 3D:
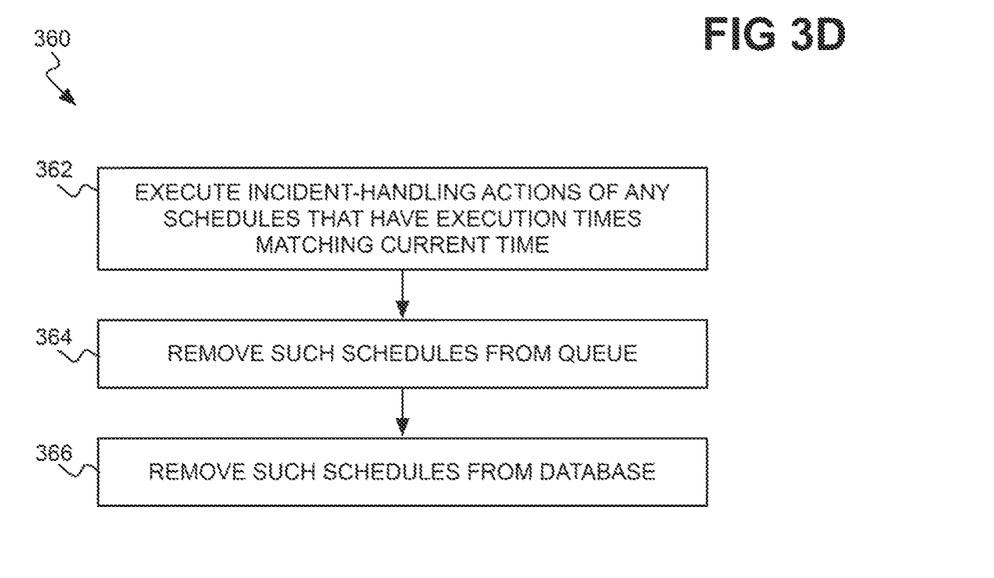

The method 360 of FIG. 3D is performed responsive to the current time equaling or matching the execution times of one or more schedules within the queue 214. The action runner 224 executes the incident-handling actions of such schedules (362). The action runner 224 also removes these schedules from the queue 214 (364), as well as from the database 212 (366).

FIGS. 4A, 4B, 4C, 4D, and 4E depict timing diagrams of how the methods 300, 320, 340 and 360 can be performed within the incident-handling system 104 responsive to an example sequence of events. First, in FIG. 4A, at a current time T, an incident is generated. Therefore, per the method 300, the incident is received in part 302, and is assumed to have matched two rules in part 304. Two matching states are added in part 306, and two schedules are generated in part 308. The first schedule has an execution time ET1, and the second schedule has an execution time ET2. The schedules are added to the database 212 in part 310.

Figure 4A:
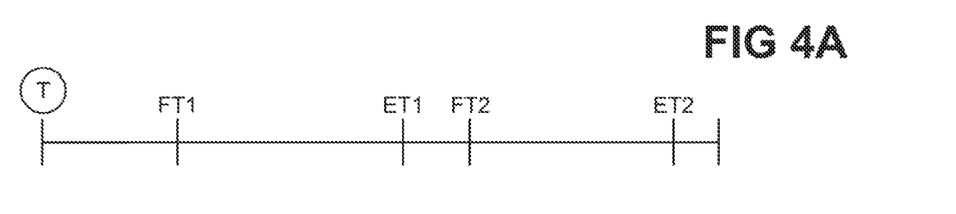
FIGS. 4A, 4B, 4C, and 4E are timing diagrams depicting performance ref an incident-handling system responsive to an example sequence of events.

As depicted in FIG. 4A, the execution time ET1 of the first schedule compares to the first and second future times FT1 and FT2 such that FT1<ET1<FT2. Therefore, the first schedule is added to the queue 214 in part 312. As also depicted in FIG. 4A, the execution time ET2 of the second schedule compares to the first and second future times FT1 and FT2 such that ET2>FT1 and ET2>FT2. Therefore, the second schedule is not added to the queue 214 in part 312.

Figure 4B:
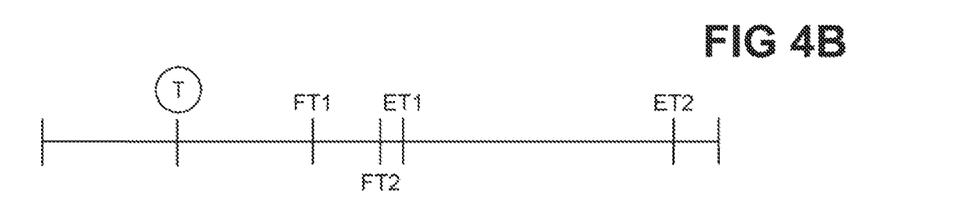

In FIG. 4B, the current time T has advanced to the original first future time FT1 of FIG. 4A. Therefore, per the method 340 of FIG. 3C, the first and second future times FT1 and FT2 are reset in part 342, as depicted in FIG. 4B. Note that the second future time FT2 occurs sooner in FIG. 4B as compared to in FIG. 4A. Whereas in FIG. 4A the execution time ET1 of the first schedule was sooner than the second future time FT2, in FIG. 4B the execution time ET1 is now later than the second future time FT2. Therefore, the first schedule is removed from the queue 214 in part 346.

Figure 4C:
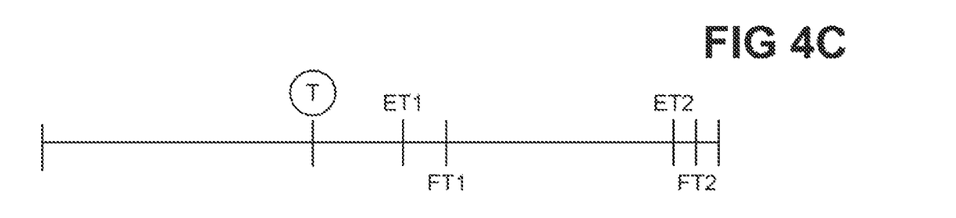

In FIG. 4C, the current time T has advanced to the revised first future time FT1 of FIG. 4B. Again per the method 340 of FIG. 3C, the first and second future times FT1 and FT2 are reset in part 342, as depicted in FIG. 4C. The second future time FT2 occurs much later in FIG. 4C than it did in FIG. 4B. As such, the execution times ET1 and ET2 of the schedules are now each sooner than the second future time FT2. Therefore, the first and second schedules are added to the queue 214 in part 344.

Figure 4D:
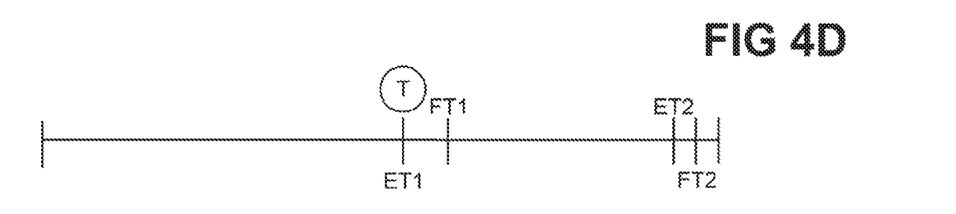

In FIG. 4D, the current time T has advanced to the execution time ET1 of the first schedule. Therefore, per the method 360 of FIG. 3D, the incident-handling action of the first schedule is executed in part 362. The first schedule is then removed from the queue 214 in part 364, and is removed from the database 212 in part 366. However, the second schedule still remains in both the queue 214 and in the database 212.

Figure 4E:
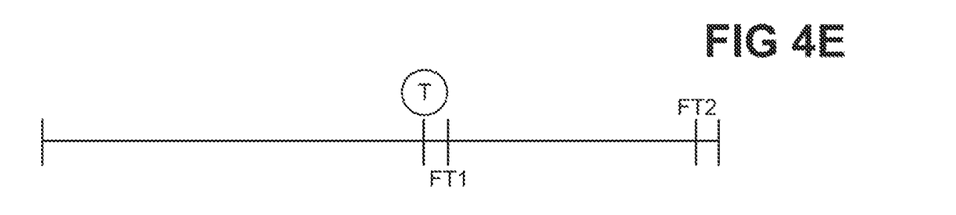

In FIG. 4E, at the now-current time T, the incident that resulted in generation of the first and second schedules has been resolved, presumably due to the incident-handling action of the first schedule having been performed. Therefore, per the method 320 of FIG. 3D, that the incident is no longer present is determined, or notification regarding which is received, in part 322. The matching states pertaining to the incident that were previously added to the database 212 are removed from the database in part 312.

Although the first schedule was already removed from the queue 214 and from the database 212, as described above in relation to FIG. 4D, the second schedule pertaining to this incident still remains in both the queue 214 and the database 212. Therefore, the second schedule is removed from the database 212 in part 326, and from the queue 214 in part 328. As such, the execution time ET2 of this now-removed second schedule is not depicted in FIG. 4E.

We claim:

1. A method comprising:
specifying first and second future times, the first future time occurring sooner than the second future time, the first future time indicating when the first and second future times are to be specified again, the second future time providing a boundary between schedules occurring sooner and schedules occurring later;
generating and adding a schedule to a database stored in a non-volatile storage, by a processor, the schedule for executing, in relation to an incident, an incident-handling action corresponding to a condition matching the incident, the schedule having an execution time at which to execute the incident-handling action in relation to the incident;
where the execution time is sooner than the second future time, adding the schedule to a queue stored in a volatile memory, by the processor;
upon a current time equaling the execution time, removing the schedule from the queue and correspondingly executing the incident-handling action in relation to the incident, by the processor; and
upon the current time equaling the first future time, specifying the first future time and the second future time again.

2. The method of claim 1, further comprising:
where the execution time is later than the second specified time, not adding the schedule to the queue.

3. The method of claim 1, further comprising:
upon the current time equaling the first future time,
where the schedule is not in the queue and where the execution time is sooner than the second future time as has been specified again, adding the schedule to the queue, by the processor.

4. The method of claim 3, wherein a first time delta separates the first future time from the current time, and a second time delta separates the second future time from the current time,
and wherein specifying the first future time and the second future time again comprises specifying the first future time as the current time plus the first time delta, and specifying the second future time as the current time plus the second time delta.

5. The method of claim 4, wherein the first time delta and the second time delta are static, such that the first time delta and the second time delta remain unchanged when the first future time and the second future time are specified again.

6. The method of claim 4, wherein one or more of the first time delta and the second time delta are dynamic, such that the one or more of the first time delta and the second time delta change when the first future time and the second future time are specified again.

7. The method of claim 6, wherein the one or more of the first time delta and the second time delta change based on one or more of:
a size of the queue;
a number of schedules in the queue.

8. The method of claim 1, further comprising:
where the incident no longer occurs,
removing the schedule from the database; and,
removing the schedule from the queue where the schedule is in the queue.

9. The method of claim 1, further comprising:
after executing the incident-handling action in relation to the incident, removing the schedule from the database.

10. The method of claim 1, further comprising:
determining, by the processor, that the incident matches the condition.

11. The method of claim 1, further comprising:
where the schedule is in the queue and where the execution time is later than the second future time as has been specified again, removing the schedule from the queue, by the processor.

12. A system comprising:
a processor;
a non-volatile storage device to store a database of schedules, each schedule for executing in relation to an incident, and at an execution time, an incident-handling action corresponding to a condition matching the incident;
a volatile memory device to store a queue of just the schedules of which the execution times are sooner than a second future time that occurs later than a first future time, the first future time indicating when the first and second future times are to be evaluated, the second future time providing a boundary between the schedules occurring sooner and the schedules occurring later; and,
a computer-readable data storage medium to store computer-readable code executable by the processor to implement a schedule manager to manage the schedules within the database and within the queue, based on a current time, the first and second future times, and the execution times of the schedules; and
wherein the computer-readable code is executable by the processor to, upon the current time equaling the first future time, specify the first future time and the second future time again.

13. The system of claim 12, wherein the database is further of matching states of the incidents and the conditions,
and wherein the computer-readable data storage medium is further to store computer-readable code executable by the processor to implement a rule checker to manage matching states of the incidents and the conditions.

14. The system of claim 12, wherein the computer-readable data storage medium is further to store computer-readable code executable by the processor to implement an action runner to execute the incident-handling actions of the schedules in the queue having execution times that match the current time.

15. The system of claim 14, wherein the volatile memory device is further to store a cache through which the matching states of the database are accessed by the action runner.

16. The system of claim 12, wherein the computer-readable code is executable by the processor to:
where a given one of the schedules is in the queue and has an execution time that is later than the second future time as has been specified again, remove the schedule from the queue.

17. The system of claim 12, wherein the computer-readable code executable by the processor to specify the first future time and the second future time again comprises computer-readable code executable by the processor to:

specify the first future time as the current time plus a first time delta, and specify the second future time as the current time plus a second time delta wherein the one or more of the first time delta and the second time delta are determined, when the first future time and the second future time are specified again, based on one or more of:

a size of the queue;

a number of schedules in the queue.

18. A non-transitory computer-readable data storage medium comprising computer-readable code executable by a processor to:

generate and add a schedule to a database stored in a non-volatile storage, the schedule for executing, in relation to an incident, an incident-handling action corresponding to a condition matching the incident, the schedule having an execution time at which to execute the incident-handling action in relation to the incident;

where the execution time is sooner than a second future time that occurs later than a first future time, add the schedule to a queue stored in a volatile memory, the first future time indicating when the first and second future times are to be evaluated, the second future time providing a boundary between schedules occurring sooner and schedules occurring later; and, upon a current time equaling the execution time, remove the schedule from the queue and correspondingly execute the incident-handling action in relation to the incident; and upon the current time equaling the first future time, specify the first future time and the second future time again.

19. The storage medium of claim 18, wherein the computer-readable code is executable by the processor to:

where the schedule is in the queue and where the execution time is later than the second future time as has been specified again, remove the schedule from the queue.

20. The storage medium of claim 18, wherein the computer-readable code executable by the processor to specify the first future time and the second future time again comprises computer-readable code executable by the processor to:

specify the first future time as the current time plus a first time delta, and specify the second future time as the current time plus a second time delta wherein the one or more of the first time delta and the second time delta are determined, when the first future time and the second future time are specified again, based on one or more of:

a size of the queue;

a number of schedules in the queue.

* * * * *